United States Patent [19]
Andrews

[11] Patent Number: 5,106,645
[45] Date of Patent: Apr. 21, 1992

[54] PRODUCT AND PROCESS OF MAKING A HIGH FIBER FLOUR-TYPE PRODUCT DERIVED FROM SUGAR CANE

[76] Inventor: Kevin R. Andrews, 41-745 Mooiki St., Waimanalo, Hi. 96795

[21] Appl. No.: 478,632

[22] Filed: Feb. 12, 1990

[51] Int. Cl.[5] .......................... A23D 2/36; A23L 1/308
[52] U.S. Cl. ........................ 426/622; 426/481; 426/483; 426/615; 426/623; 426/640
[58] Field of Search ............... 426/615, 622, 623, 636, 426/640, 481, 483, 484, 489

[56] References Cited

U.S. PATENT DOCUMENTS

| | | | |
|---|---|---|---|
| 3,424,611 | 1/1969 | Miller | 127/2 |
| 3,424,612 | 1/1969 | Miller | 127/2 |
| 3,566,944 | 3/1971 | Tilby | 146/222 |
| 3,567,510 | 3/1971 | Tilby | 127/2 |
| 3,690,358 | 9/1972 | Tilby | 146/119 |
| 3,698,459 | 10/1972 | Tilby | 146/117 R |
| 3,721,567 | 3/1973 | Miller | 127/42 |
| 3,796,809 | 3/1974 | Miller | 426/2 ND |
| 3,827,909 | 8/1974 | Farmer | 127/3 |
| 3,873,033 | 3/1975 | Tilby | 241/19 |
| 3,976,498 | 8/1976 | Tilby et al. | 127/2 |
| 3,976,499 | 8/1976 | Tilby | 127/42 |
| 4,012,535 | 3/1977 | Fiala et al. | 426/636 |
| 4,151,004 | 4/1979 | Vukelic | 127/2 |
| 4,312,677 | 1/1982 | Tiby et al. | 127/2 |
| 4,572,741 | 2/1986 | Mason | 127/2 |
| 4,609,405 | 9/1986 | Elliott | 127/3 |
| 4,743,307 | 10/1988 | Mason | 127/2 |
| 4,797,297 | 1/1989 | O'Sullivan | 426/807 |

Primary Examiner—Donald E. Czaja
Assistant Examiner—Helen Pratt
Attorney, Agent, or Firm—Connors and Associates

[57] ABSTRACT

Disclosed is a flour-type product derived from sugar cane which contains a high dietary fiber concentration. This product is made by separating the pith of the sugar cane from the rind and epidermal layer and then removing from the pith any rind residue from a first stage separation and long fibrovascular bundles embedded in the parenchyma cells of the pith. The clean pith is dried and milled to shred the walls of the parenchyma cells into fiber having a length not exceeding 300 microns.

9 Claims, 1 Drawing Sheet

PRODUCT AND PROCESS OF MAKING A HIGH FIBER FLOUR-TYPE PRODUCT DERIVED FROM SUGAR CANE

BACKGROUND OF THE INVENTION

1. Field of the Invention

This invention relates to a flour-type product which is made from sugar cane and is suitable for human consumption. Particularly, this invention relates to such a flour-type product that has a high dietary fiber content and is essentially free of fibrovascular bundles and rind residue.

2. Background Discussion

Sugar cane is conventionally processed to produce sucrose. It comprises an outer epidermal layer attached to a wood-like, intermediate rind which encases an inner, soft pith. The pith is a matrix of thin-walled parenchyma cells in which are embedded long, internal, fibrovascular bundles extending longitudinally along the sugar cane stalk. The parenchyma cells contain a liquid having a high concentration of sugar, primarily sucrose.

In U.S. Pat. No. 3,721,567 and U.S. Pat. No. 3,796,809 there are disclosed livestock feeds derived from sugar cane. Such livestock feed is a mixture of the pith and dietary supplements. It is prepared by separating the epidermal layer, the rind, and the pith, and then adding to the pith the dietary supplements. The equipment used to separate the epidermal layer and rind from the pith is disclosed in U.S. Pat. No. 3,567,510 and U.S. Pat. No. 3,976,498. Because they are not considered detrimental to animals, the internal fibrovascular bundles are not removed from the pith to make the livestock feed.

With greater appreciation of the need for human food products to have a higher fiber content, the livestock feed derived from sugar cane has been the subject of intensive research. The problem with the livestock feed is that the separation of the rind from the pith is incomplete, with significant amounts of the rind remaining in the pith even after separation. Moreover, and even more importantly, the fibrovascular bundles in the pith are not separated from the parenchyma cells. Because fibrovascular bundles from the pith and rind residue are present in sugar cane derived livestock feed, it is unsuitable for human consumption. One reason is that the rind residue and fibrovascular fiber bundles disintegrate into needle-like particles which cannot be safely consumed by humans.

SUMMARY OF THE INVENTION

The present invention is a new flour-type product derived from sugar cane which is suitable for human consumption and is essentially free from the fibrovascular bundles and rind residue commonly found in sugar cane derived from livestock feed. This flour type product is characterized by having a high fiber content, with essentially all the dietary fibers being derived exclusively from the walls of the parenchyma cells. In accordance with this invention, the product contains in excess of 85 percent dry weight of these fibers. The fibers are obtained by first separating the fibrovascular bundles and rind residue from the parenchyma cells and then grinding the cells to shred the walls of the cells into fibers which are suitable for human consumption. These fibers, being essentially cellulose, have been experimentally found to be a compatible substitute in most formulations using wood derived cellulose products. These fibers have a length which does not exceed 300 microns. The bulk of the fibers have an average length ranging between 50 and 100 microns, but there are present fibers less than 50.

The flour-type product of this invention may have either a high or low sugar content: The high sugar product contains sugar in an amount essentially equal to the amount of sugar normally present in unprocessed pith. The high sugar content product contains from 60 to 70% by weight sugar, 20 to 30% by weight fiber, and 5 to 10% by weight water. The low sugar product contains less than 5% by weight sugar. The present invention also includes the process for making the flour-type product.

There are several features of this invention, no single one of which is solely responsible for its desirable attributes. Without limiting the scope of this invention as expressed by the claims, its prominent features shall be discussed in the section entitled "DETAILED DESCRIPTION OF THE PREFERRED EMBODIMENTS."

BRIEF DESCRIPTION OF THE DRAWING

The preferred embodiments of this invention illustrating all its features shall now be discussed in connection with the accompanying drawing. These embodiments depict the novel and non-obvious flour-type product of this invention and process for making this product. The drawing, which is for illustrative purposes only, includes the following figure (FIG.), with like numerals indicating like parts.

DETAILED DESCRIPTION OF THE PREFERRED EMBODIMENTS

Figure 1:
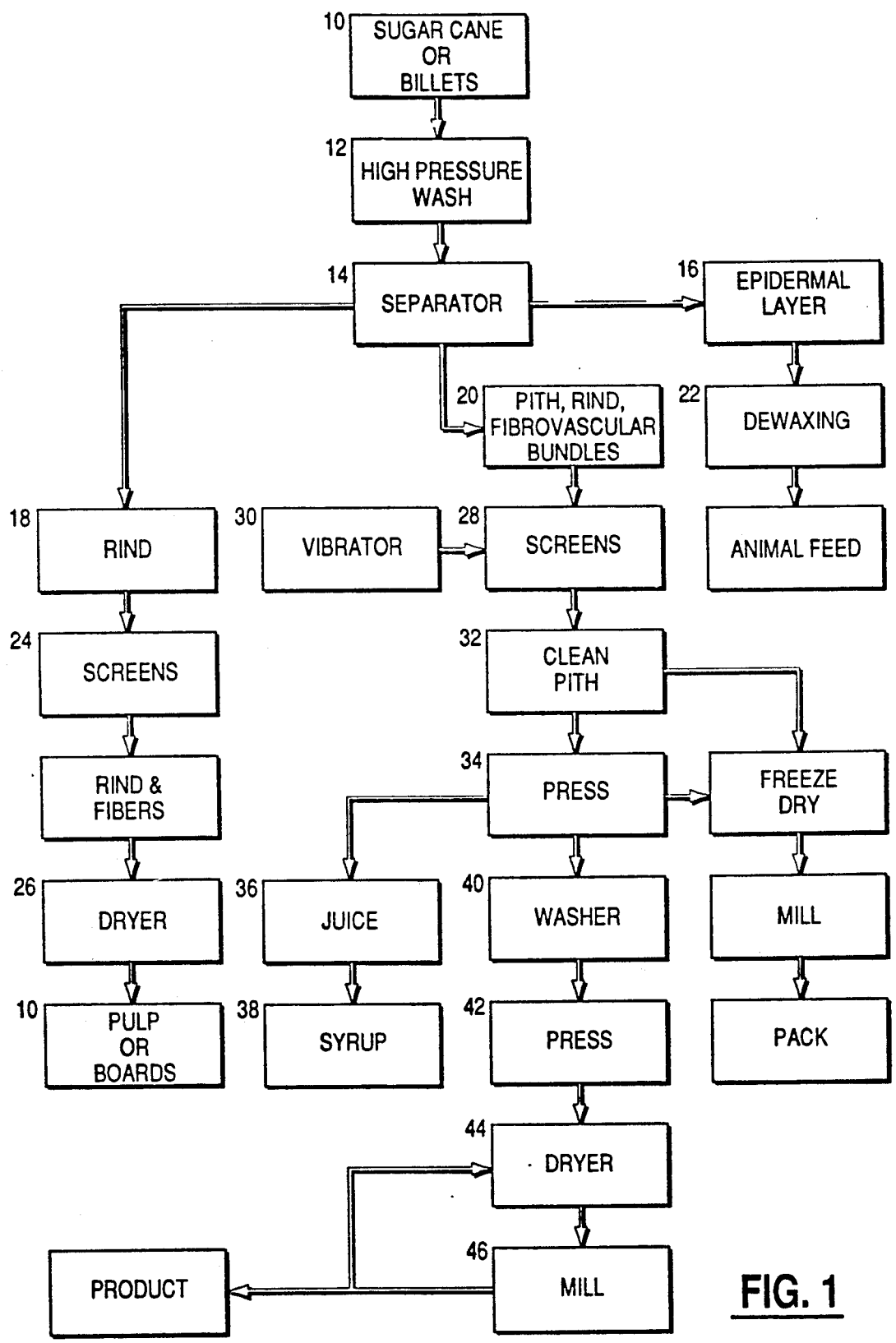
FIG. 1 schematically depicts the process for making the product of this invention.

The Process:

As shown in FIG. 1, whole cane stalks or 10 to 18 inch long billets 10 are first washed with hot water in a high pressure washer 12. The preferred way this is accomplished is to spray the hot water as a jet stream on the billets 10, resulting in the pith 20 having a high moisture content (in excess of 80% by weight). The hot wash water preferably is at a temperature of from 150 to 200 Fahrenheit and a pressure of from 3,500 to 4,500 pounds per square inch.

Next, using a conventional cane separator 14 similar to that manufactured by Intercane World Corporation Ltd., Edmonton, Alberta, Canada, the epidermal layer 16, the rind 18, and pith 18 are separated into three segregated process streams.

The epidermal layer 16 from the separator 14 is forwarded to a dewaxer 22 and the wax normally present in this layer recovered. The non-wax constituents are used as animal feed. Separation of the epidermal layer 16 is done in a fashion to remove extraneous matter and debris so that during subsequent processing the epidermal layer 16, rind 18 and pith 20 are uncontaminated.

The rind 18 from the separator 14 is passed through a screen 24 which separates from the rind any pith mixed with the rind. This is necessary because the separator 14 does not make a complete separation of rind and pith. On passing through the screen 24 the rind and any fibrovascular bundles mixed with the rind are completely segregated from the parenchyma cells of the pith. The rind and accompanying fibrovascular fiber bundles are dried in dryer 26 and then converted into a paper like pulp or press board. The rind 18 makes an excellent raw material for the production of dimension lumber, particle and wafer board, core panel, and various hard boards. Also, because it is now free of the epidermal layer and pith, it is an excellent pulping material.

The pith 20 exiting the separator 14 contains bundles of the long fibrovascular fibers and rind residue. The bulk of the pith is in the form of sawdust-like fiber particles which pass through a screen 28 (mesh 20), with the rind residue and fibrovascular fibers remaining on the top of this screen. A vibrator 20 is connected to the screen 28 and negative pneumatic pressure is applied to the screen to separate all the relatively short pith fibers from the relatively long fibrovascular bundle fibers and rind residue fibers. These long fibers are forwarded with the rind 18 to the dryer 26. Thus, essentially all the fibrovascular bundle fibers and rind fibers are separated from the parenchyma cells of the pith 20.

The clean pith 32 now contains essentially only parenchyma cells, being free of rind residue and fibrovascular bundles. This clean pith 32 is then passed through a conventional sugar press 34 to squeeze from the cells the liquid they contain. This liquid is a juice 36 which contains mainly sugar dissolved in water. This juice may be concentrated into syrup 38 or spray dried into a natural amorphous sugar. The mass of clean pith fibers 32 remaining after extraction of the liquid from the cells is the raw material from which the low sugar flour-type product of this invention is made. It is washed with water in a washer 40, with the wet fiber mass being dewatered by mechanically squeezing in a press 42. The clean pith fibers 32 exiting the press 42 have a moisture content in excess of 50% by weight. Then the mass of clean pith fibers 32 are dried in a flash dryer 44 to reduce their moisture content to less than 15% by weight. This flash dryer 44 is in the form of a loop or torroid conduit through which hot air carrying the clean pith fibers 32 is circulated. The initial temperature of the hot air entering the flash dryer 44 ranges between 1000 and 1300 degrees Fahrenheit. Moisture laden air from the flash dryer 44 is passed into a cyclone where particle fines are recovered in a bag house. The flash dryer 44 tends to break the clean pith fibers 32 into shorter lengths. These shorter and dryer fibers exiting the dryer 44 have a moisture content of from 13 to 15% by weight. They are ground in a mill 46 to shred the walls of the parenchyma cells into the product of this invention which contains in excess of 85% by dry weight. This grinding further reduces the moisture content of the product of this invention to about 7 to 10% by weight.

In accordance with one feature of this invention, the low moisture flour-type product from the mill 46 is blended with high moisture containing pith fibers from the press 42.

Preferably, the ratio of high moisture to low moisture containing fibers ranges between 15/85 and 50/50.

If one desires to make the high sugar product, the clean pith 32 is freeze dried and then this freeze dried material is ground to shred the parenchyma cells into the fibers. Since the sugar has not been extracted, this product contains essentially the same amount of sugar originally present in the unprocessed parenchyma cells.

The Product

The product of this invention is essentially all fibers having a length which does not exceed 300 microns. It is low in moisture content, preferably less than 8% by weight. It is essentially free of silica due to the separation of the rind from the pith. Because of the way it processed, it has a white, flour-like appearance and feel. And most importantly, it is free of fibrovascular bundle fibers and rind residue fibers.

The following TABLE presents an analysis of the low sugar product of this invention.

TABLE

| Constituents | Units |
| --- | --- |
| Protein, by Kuelposs (×6.25) | 0.81% |
| Moisture Vacuum 70DD. On | 8.15% |
| Fat, Acid Hydrolysis, Robot | 1.0% |
| Ash, Over Night | 0.87% |
| Carbohydrates, Total | 89.1% |
| Calories per 100 grams | 17.0% |
| Carbohydrates, Available | 1.2% |
| Fiber, Total Dietary | 87.97% |
| Lead | 1.46 ppm |
| Fructose | 0.60% |
| Glucose | 0.70% |
| Sucrose | 1.30% |
| Maltose | none |
| Lactose | none |

The flour-type product of this invention in addition to being a food suitable for human consumption may be used in cosmetics and drugs and for industrial applications. For example, it may be an absorbant for oils, fats, and moisture, a flow enhancer, duster, bulking agent, dispersant, abradent, base for tablets and pills, welding rod flux, anticaking agent, carrier agent, etc.

SCOPE OF THE INVENTION

The above description presents the best mode contemplated of carrying out the present invention. This invention is, however, susceptible to modificatons and alternate constructions from the embodiments shown in the drawing and discussed above. Consequently, it is not the intention to limit this invention to the particular embodiments disclosed. On the contrary, the intention is to cover all modifications and alternate constructions coming within the spirit and scope of this invention as generally expressed by the following claims:

I claim:

1. A process for converting sugar cane stalks which ave a pith into a high fiber flour-type product, comprising the steps of:
   (a) separating the pith of the sugar cane stalks from the other parts of the stalks, and
   rendering the product suitable for human consumption by
      (i) cleaning the pith to remove from parenchyma cells of the pith fibrovascular bundles embedded in the parenchyma cells and
      (ii) shredding the cleaned parenchyma cells from step (b) into fibers having a length not exceeding 300 microns,
   said product consisting essentially of fibers derived exclusively from said cleaned parenchyma cells.

2. The process of claim 1 wherein the pith includes sugar and water, and the sugar is removed from the pith prior to step (c).

3. The process of claim 2 wherein the pith is dried to remove water prior to step (c).

4. The process of claim 1 wherein the pith is washed with water, pressed to squeeze water from the wet pith, flash dried in a zone through which hot air passes, with a portion of the flash dried pith being recycled to the flash drying zone.

5. The process of claim 1 wherein after step (b) and prior to step (c) the pith is freeze dried.

6. A flour-type product derived exclusively from the parenchyma cells of the pith of sugar cane cleaned to render the product suitable for human consumption, including removing fibrovascular fibers normally present in the pith, said product consisting essentially of dietary fibers made by shredding the walls of the parenchyma cells of the cleaned pith, said fibers being in excess of 85% by dry weight of the product and having a length not exceeding 300 microns, said product characterized in that essentially all the fibrovascular fibers normally present in the pith are removed prior to shredding the walls of the parenchma cells.

7. The product of claim 6 having a sugar content essentially equal to the amount of sugar normally present in the pith.

8. The product of claim 6 having a sugar content of less than 6 percent by weight.

9. The product of claim 6 having a moisture content of less than 8 percent by weight.

* * * * *

UNITED STATES PATENT AND TRADEMARK OFFICE
CERTIFICATE OF CORRECTION

PATENT NO. : 5,106,645
DATED : April 21, 1992
INVENTOR(S) : Kevin P. Andrews

It is certified that error appears in the above-indentified patent and that said Letters Patent is hereby corrected as shown below:

Col. 4, Claim 1, line 45, delete "ave" and insert in place thereof --have--.

Col. 4, Claim 1, line 49, insert at the beginning of the line --(b)--.

Col. 4, Claim 1, line 55, delete "(b)" and insert in place thereof --(i)--.

Col. 4, Claim 2, line 61, delete "(c)" and insert in place thereof --(ii)--.

Col. 5, Claim 5, line 1, delete "(b)" and insert in place thereof --(i)--.

Col. 5, Claim 5, line 2, delete "(c)" and insert in place thereof --(ii)--.

Signed and Sealed this

Fifth Day of July, 1994

Attest:

BRUCE LEHMAN

Attesting Officer     Commissioner of Patents and Trademarks